(12) United States Patent
Biziorek et al.

(10) Patent No.: US 7,331,279 B2
(45) Date of Patent: Feb. 19, 2008

(54) ROUND BALING PRESS

(75) Inventors: Stéphane Biziorek, Champlitte (FR); Lionel Guiet, Gray (FR); Clément Humbert, Arguel (FR)

(73) Assignee: Deere & Company, Moline, IL (US)

( * ) Notice: Subject to any disclaimer, the term of this patent is extended or adjusted under 35 U.S.C. 154(b) by 99 days.

(21) Appl. No.: 11/121,665

(22) Filed: May 4, 2005

(65) Prior Publication Data

US 2005/0247215 A1    Nov. 10, 2005

(30) Foreign Application Priority Data

May 8, 2004  (DE) .................... 10 2004 022 801

(51) Int. Cl.
*B30B 15/14* (2006.01)
(52) U.S. Cl. .......................... 100/48; 100/76
(58) Field of Classification Search .................. 100/76, 100/78, 87–89, 99, 48
See application file for complete search history.

(56) References Cited

U.S. PATENT DOCUMENTS

| 4,389,930 | A |   | 6/1983  | Rutschilling et al. |        |
|-----------|---|---|---------|---------------------|--------|
| 4,566,380 | A | * | 1/1986  | Clostermeyer et al. | 100/89 |
| 4,624,179 | A |   | 11/1986 | Yves et al.         |        |
| 4,855,924 | A |   | 8/1989  | Strosser et al.     |        |
| 5,231,828 | A |   | 8/1993  | Swearingen et al.   |        |
| 5,615,544 | A | * | 4/1997  | Berger et al.       | 56/341 |
| 5,631,826 | A |   | 5/1997  | Chow et al.         |        |
| 5,802,825 | A |   | 9/1998  | Chow et al.         |        |
| 6,622,455 | B2| * | 9/2003  | Davis et al.        | 53/399 |
| 2003/0024407 | A1 |   | 2/2003 | Wiechart           |        |

FOREIGN PATENT DOCUMENTS

| DE | 31 18 663  | 12/1982 |
| DE | 40 12 738  | 5/1991  |
| DE | 41 40 483  | 6/1993  |
| DE | 44 42 479  | 11/1994 |
| DE | 199 19 322 | 1/1999  |
| DE | 199 19 323 | 4/1999  |
| DE | 101 07 625 | 2/2001  |
| DE | 100 57 135 | 5/2002  |
| DE | 102 12 722 | 10/2003 |
| DE | 103 03 201 | 8/2004  |
| EP | 1 266 562  | 12/2002 |

OTHER PUBLICATIONS

German Search Report, Jul. 11, 2007, 3 Pages.

* cited by examiner

*Primary Examiner*—Shelley M. Self

(57) ABSTRACT

The invention relates to a round baling press having a baling press chamber and a door arranged in the rear section of the baling press chamber. The door is movable along a path between a closed position, in which the door extends along the back side of the baling press chamber, and an open position in which a completely formed bale can be ejected from the baling press chamber. The baling press further includes at least one sensor providing information on the position of the door. The sensor provides a signal value which contains information on the respective position of the door along its path of movement.

8 Claims, 2 Drawing Sheets

ROUND BALING PRESS

BACKGROUND

1. Field of Invention

This invention relates to a round baling press including a baling press chamber, a door arranged in the rear section of the baling press chamber, the door being movable along a path between a closed position, in which the door extends along the back side of the baling press chamber, and an open position, in which a completely formed bale can be ejected from the baling press chamber, and a sensor for providing information on the position of the door.

2. Related Technology

Round baling presses are used for producing bales from stalk-shaped crop material in agriculture. Such round baling presses exhibit a baling press chamber and the appertaining pressing means. After final forming of a bale is completed, a rear door swings upward to eject the bale.

In the state of the art, it is known that a sensor can be assigned to the door to obtain information as to whether the door is closed or not, and to provide the operator of the tractor hauling the round baling press with the appropriate information on the status of the door as disclosed in U.S. Pat. No. 4,855,924 and German Patent No. DE 4,442,479 C. It is also known that the sensor can be assigned to regulate automatically controlled functions as disclosed in U.S. Pat. No. 5,231,828 A. It is further known that the sensor can be assigned to control a subsequent wrapping machine as disclosed in German Patent Nos. DE 19,919,322 A and DE 19,919,323 A. It is also further known that a sensor can be assigned, for reasons of safety, to bring to a stop the elements that are driven by the round baling press when the door is to be opened by hand as disclosed in German Patent No. DE 10,107,625 A1. Beyond the binary data as to whether the door is open or not, existing sensors are not capable of providing any information as to the specific position of the door. Nevertheless, such information can be vital for various purposes.

In the U.S. Pat. No. 5,802,825 A, a round bale cutter is described with a sensor determining the size of the bales, the sensor being embodied as a potentiometer.

The subsequently published German Patent DE 10,339,652 A, describes a round baling press with a door that is activatably movable by a hydraulic drive.

BRIEF SUMMARY

The underlying problem of the invention is solved by using a round baling press in which at least some of the above-mentioned shortcomings are not present or only exist to a limited extent. The design of the sensor for recording the position of the door is provided in such a manner that the sensor is capable of recording one, several or a random number of intermediate values for the position of the door during the door's movement along its path between the open and closed position, and is capable of signaling the position. One thereby not only obtains binary data but also information more specific to the position of the door.

The sensor is connected to a control that controls an actuator set up to change the position of the door. Depending on the value of the signal from the sensor, the control controls the actuator. This makes it possible, among other things, to have the actuator move at a speed which depends on the respective position of the door. Thus, the door can initially move at an accelerated pace and toward the end, and when it is opened or closed, it can move at a decelerated pace. The control can select the appropriate speed from tables in which the speeds are stored as function of the position of the door. These tables are preferably provided with a resolution that is sufficiently high to cover abrupt acceleration processes without need for concern.

A finished or nearly completely formed bale exerts a force upon the door and can partially open or completely bring the door into the open position, even against an initial stressing force, based on the sheer weight of the door and possibly based on additional pretensioning elements such as springs or hydraulic cylinders. The detection of the door's movement by the sensor makes it possible to provide the control with information as to the finishing status of the bale and to, accordingly, inform the operator of the round baling press or of the tractor hauling the baler. As an alternative or in addition, the signal from the sensor can activate means for wrapping the bale and inducing an automatic opening of the door by one or more actuators. After passing through the open door, the bale is then dropped to the ground or transferred over to a wrapping machine.

During subsequent closing of the door, the control can determine whether the door was properly closed based on the signal from the sensor. If this is not the case, because, for example, the bale got stuck between the door and the round baling press, corresponding information to this effect can be provided to the operator.

In an embodiment of a round baling press having a variable baling chamber volume, the size of the bale is programmable. To date, the door dwells in the widest possible opening position, regardless of the bale size. In the case of smaller bales, which, are produced of silage, this means that there is an unnecessary loss of time. Round baling presses with variable baling chamber volumes therefore provide the option of having the door dwell in an open position that is based on the size of the bale. With the sensor in accordance with the invention, it is determined when the specific open position has been reached, upon which the opening process is then interrupted.

During forming of a bale, the bale presses up against the door. By positioning a sensor on each of the two opposing sides at which the door opens, there is the possibility of generating information on the form of the respective bale based on the possible differences in the values measured by the sensors. Accordingly, if the bale presents with a diameter that is larger on the one side than on the other, then this information can be provided to the operator of the tractor hauling the round baling press, by a display device or a voice output so that the operator can steer the tractor in such a manner as to make said difference become smaller. As an alternative or in addition, an appropriate steering direction can be calculated based on the values measured by the sensors and supplied to an automatic guidance control device. Additionally, the sensors on both sides of the door can also be useful, for example, in determining redundancy.

In one embodiment of the invention, the sensor is set up to record the distance between a portion of the door and a portion of the round baling press that does not wove with the door. In an alternate embodiment, the sensor records the distance between the ground and the door, the door being movable in an upward swinging motion around a horizontal axis running transverse to the direction of travel; or being movable in another manner, for example, slidable in a vertical direction. In both forms of embodiment, an operatively contactless remote sensor can be used, such as, for example, an ultrasonic range measuring device or a laser range measuring device. The sensor can emit digital or analog output signals; the latter are preferably digitized so as to be compatibly processed by a digital control. Coming under consideration, for example, are potentiometers, ultrasonic sensors and/or proximity sensors. One poastle configuration would be a sensor that records the rotational angle of the door around a swiveling axis, around which said door moves between the open and closed position. Another configuration is a sensor that records the position of an actuator which moves the door between the open and closed position.

The sensor can hereby exhibit elements, all or some of which are configured in the housing of the actuator, such as a rotary potentiometer a slide potentiometer or a permanent magnet, whose position is determined by the appropriate sensors outside of the housing. The possibility also exists of capturing the quantity of external power activation means supplied to the actuator. For example, the fluid that is supplied to or flows from the actuator in the form of a hydraulic cylinder, and from this, deduce information as to its position. In the case of a stepper motor, the number of supplied impulses (the electrical energy) can be intercepted to determine position.

Furthermore, a photocell control device can be used as a sensor that works in conjunction with a perforated element, with a so-called coding disc. A means for determining the direction of the movement can be included, such as switches or an appropriate form of the perforated element. Such photocell control devices can be designed as so-called smart suspensions, that is to say, they can be spatially integrated in a support mounting.

A relatively cost-effective possibility is seen herein that a number of sensors are to be distributed along the door's path. The sensors are activated by an element on the door when the door passes in their proximity. Mechanical switches, microswitches, or inductive proximity sensors can also be used.

The motion of the door can be in a stepped up or stepped down transmission mode by the use of appropriate transmission gears in order to match up the range of motion of the door with the motion detection range of the sensor. An example would be a lever gear. An extensometer sensor for capturing the strain on the door can be used as a sensor for the door's position. The closed door undergoes less deformation than an open door. This deformation is captured by the extensometer sensor, which, for example, can figure in the form of a strain gage.

BRIEF DESCRIPTION OF THE DRAWINGS

In the drawings, one embodiment of the invention is represented with greater detail in the following.

DETAILED DESCRIPTION

Figure 1:
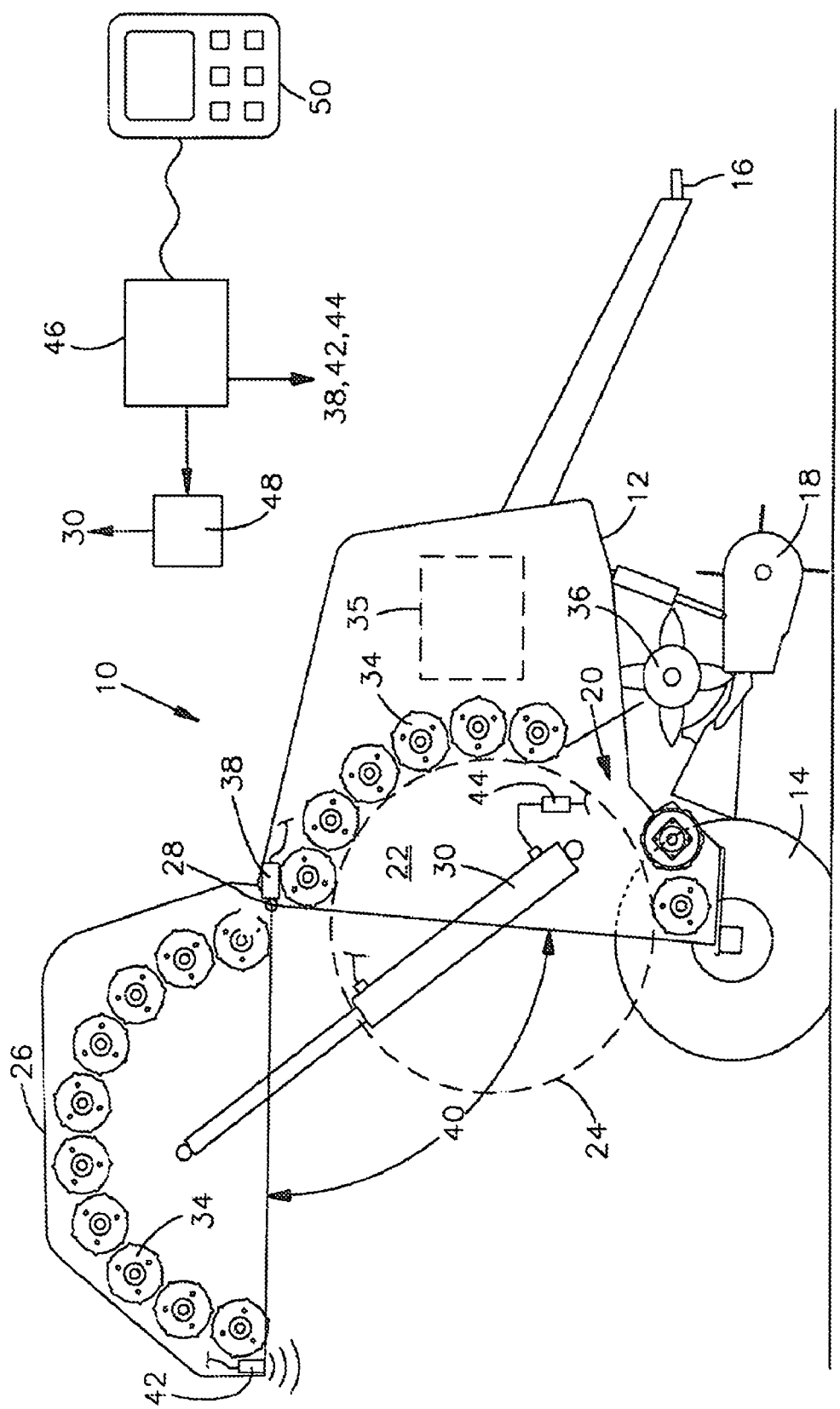
FIG. 1 shows a schematic side view of the baling press with an open door in accordance with the present invention.

FIG. 1 shows a round baling press 10, which exhibits a frame 12, supported upon two wheels 14. Arranged on the front end of the frame 12 is a drawbar 16 for hitching the round baling press 10 to a tractor for pulling it over a field. During harvesting operations, the round baling press as shown moves toward the right. A pickup device 18 in the form of a pick-up serves to pick up the crop material that is lying on the ground, such as hay or straw laid out in a windrow. The crop material collected by the pickup device 18 is fed by a conveyor rotor 36 to an inlet 20 of a baling press chamber 22 and is spirally rolled up there into large cylindrical bales 24, is bound by a binding arrangement 35 and subsequently dropped onto the ground or transferred over to a wrapping machine.

The round baling press 10 includes a rear door 26 which is hinged on the top side of the bale press to pivot around an axis 28 running horizontally and transverse to the direction of travel. In FIG. 1, the door 26 is represented in its open position. The door 26 can be moved by an actuator 30 between the represented open position and a closed position (see FIG. 2), in which it closes off the baling press chamber 22 toward the rear. To this end, it rotates counterclockwise around the axis 28.

The baling press chamber 22 is surrounded by drive rollers 34; accordingly, the round baling press has a fixed baling chamber volume. In the alternative, a round baling press with a variable baling chamber volume can be used in which case the baling chamber would be surrounded by driving belts or such similar objects.

Several sensors define a sensor arrangement that can be provided for recording the actual position of the door 26. A first sensor 38, in the form of a rotary potentiometer, records the rotational angle of the door 26 around the axis 28 on the right side of the round baling press 10, as considered relative to an observer standing behind the baling press 10 and facing in the direction of forward travel. Another such sensor (not shown) in the form of a rotary potentiometer records the rotational angle 40 of the door 26 around the axis 28 on the left side of the round baling press 10 relative to the direction of travel. A third sensor 42, in the form of an ultrasonic range measuring device records the distance between the lower end of the door 26, in the closed position, and the ground. Sensor 42 is preferably based on a run time principle. It could also operate in conjunction with a reflector, serving as a reference, which is secured to an element of the round baling press 10 that does not move together with the door 26 such as, for example, on the axis 28 or on the rear end of the baling press chamber 22.

The actuator 30 is a double action hydraulic cylinder, which is anchored to the frame 12 on the plunger side and to the door 26 on the ram side. A fourth sensor 44 configured in a line leading to the hydraulic chamber of the actuator 30 is in the form of a flow sensor. Based on the quantity of hydraulic fluid flowing into or out of the hydraulic chamber, information can be gathered as to the position of the plunger of the actuator 30 and therefore as to the position of the door 26.

The sensors 38, 42 and 44 are connected to an electronic control 46, preferably by a bus, electrical cables or optical wave guides. The control 46 can be physically located on the round baling press 10 or on board of a tractor or of another towing vehicle that pulls the baling press and supplies the movable elements of said baling press with electrical, mechanical and/or hydraulic driving power. The electronic control 46 regulates a an electro-hydraulic valve device 48, which is hydraulically connected to the two chambers of the actuator 30 via two lines. Furthermore, the control 46 is electrically connected to an input and display device 50 that is located within the viewing range of the tractor operator. The input and display device 50 preferably complies with ISO specifications and is therefore connected to the control 46 by a bus.

The mode of operation of the round baling press 10 is described below in detail. During pickup of the crop material, such as hay or straw, a bale 24 growing in size is formed in the baling press chamber 22. The door 26 is held in place in the closed position under its own weight, whereby both chambers of the actuator 30 are maintained without pressure. As soon as the bale 24 has attained a specific size, it presses upward and toward the rear on the rollers 34 which are configured on the inner side of the door 26. If the appertaining force exceeds the weight force of the door 26, the latter begins to rotate clockwise around the axis 28. In order to obtain the desired packing density of the bale 24, one could, in the bale forming phase, also exert a specified amount of pressure on the hydraulic chamber of the actuator 30 so as to impinge upon the door 26 with a greater initial stressing force. The pressure in the hydraulic chamber of the actuator 30 can be input by the operator via the input and display device 50 and can be regulated via the control 46 and the valve device 48.

As soon as the door 26 moves, the control 46 receives the corresponding signals from the sensors 38 on both sides of the round baling press 10. These signals are interpreted as an indication to the effect that the bale 24 forming process is complete and said corresponding information is provided to the operator via the input and display device 50. The operator then interrupts travel. The binding arrangement 35 for wrapping the band, net or foil around the bale 24 can be commenced. If the sensors 38 on the two sides of the round baling press 10 indicate that there are two different opening angles 40 on the two sides of the door 26, which is an indication of a non-uniform bale, this signal is sent to the operator on the input and display device 50. In the ensuing work operations, the operator can then steer to counteract the problem to enable the crop material to be centered when fed into the pickup device 18.

After the finished formation of a bale 24, the latter is to be ejected out to the ground or into a wrapping machine that is not represented. To this end, the door 26 must be brought into the opening position. Door 26 opening is carried out by the actuator 30 and is regulated by the control 46 and the valve device 48, with initiation of the opening being either manually, via the input and display device 50 or automatically by a signal received from the binding arrangement 35 indicating the completion of the binding operation. The sensors 38, 42 and 44 provide available feedback information to the control 46 as to the actual position of the door 26 along its path between the closed position and the open position. Based on the positional information from the sensors 38, 42 and 44, the opening process can therefore unfold in such a manner, preferably based on a table filed in the software, the door moves relatively slowly at the beginning of the opening movement, relatively quickly in he middle and once more relatively slowly toward the end of the opening movement.

If all of the sensors are included together, the sensors 38, 42 and 44 provide for redundancy in the event that one of the sensors should fail and also enable a cross referenced functional check. After ejection of the bale 24, the door 26 is once more closed in an analogous manner. The recording of the position of the door 26 by the sensors 38, 42 and 44 makes it possible to have overall improved control not only of the door 26, but of the round baling press 10 as well.

Figure 2:
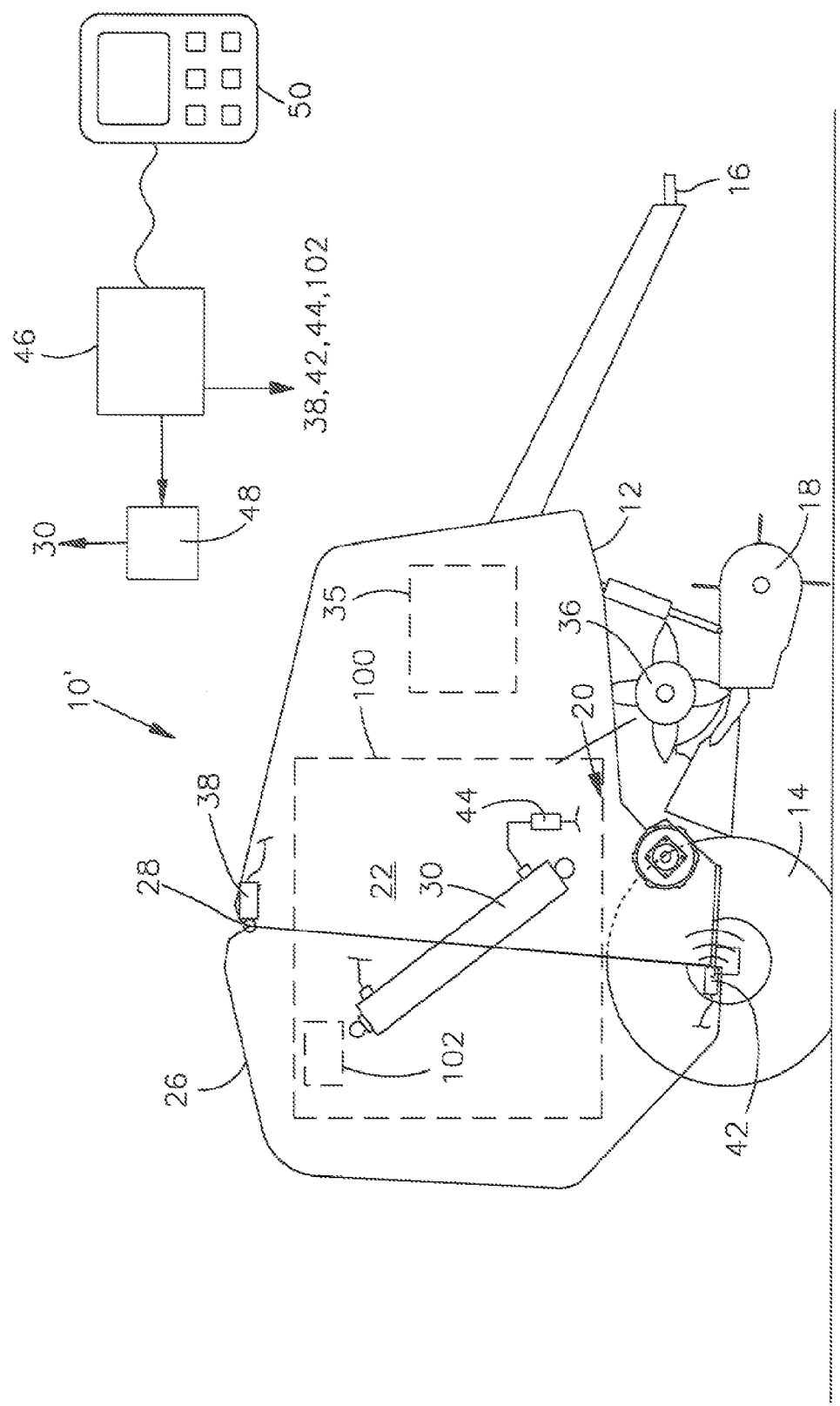
FIG. 2 is a schematic side view of a baler similar to that of FIG. 1 but showing a baler having an expansible baling chamber, with the door being closed.

Referring now to FIG. 2, there is shown a round baling press 10' which is here shown as being identical to the above-described baling press 10, except that the fixed rolls 34 have been replaced by a variable volume arrangement indicated by the functional box 100 and which cooperates with opposite side walls delimited by the chamber 22 and door 26 to define a variable volume baling chamber. A belt arrangement or any other known variable volume baling chamber design can be used as long as it has the capability of making bales of a programmable size within a range of sizes and includes a bale size sensor 102 for continuously sensing the size of the forming bale. Such variable volume baling chambers are disclosed in U.S. Pat. Nos. 4,855,924 and 5,802,825, mentioned in the foregoing "Related Technology" section, wherein the size of a bale being formed is continuously monitored by a sensor in the form of a rotary potentiometer. In the context of the present invention, a predetermined bale size can be programmed into the electronic control 46 by the input and display device 50. The bale size sensor 102 is coupled to the electronic control 46 for sending a signal representative of the size of the bale being formed. Also programmed into the electronic control 46 is the position of the door 26, when opened, which corresponds to the predetermined bale size, with one or more of the door position sensors 38, 42 and 44 sending an appropriate signal to the electronic control unit 46, when the door 26 reaches the corresponding position, so that the electro-hydraulic control valve 48 may appropriately control the actuator 30 so that it stops the door 26 at the corresponding position. In this way, cycle times of the discharge of a bale having a diameter which is less than a maximum size bale can be reduced from that required when the door 26 is opened to the maximum amount required for the discharge of a maximum sized bale.

It is therefore intended that the foregoing detailed description be regarded as illustrative rather than limiting, and that it be understood that it is the following claims, including all equivalents, that are intended to define the spirit and scope of this invention.

The invention claimed is:

1. A round baling press, comprising:

a baling press chamber having a door in a rear section of the baling press chamber, the door being movable along a path between a closed position where the door extends along the back side of the baling press chamber and a fully open position defining a discharge opening of a maximum size permitting a completely formed bale of a size which is the largest capable of being formed in said press chamber to be ejected from the baling press chamber; and a door position sensor arrangement for providing information of at least a plurality of positions of said door, including intermediate positions between said closed and fully open positions, as said door moves along said path, and the door position sensor arrangement being responsive to movement of said door for providing an electrical door position signal having a value representing a given position of said plurality of positions occupied by the door at any time as said door moves along the path;

an electronic control connected to the door position sensor arrangement;

an electro-hydraulic control valve being connected to said electronic control;

an extensible and retractable hydraulic actuator being connected to the to the electro-hydraulic control valve and to the door so as to be capable of moving the door between the fully open and closed positions; and said electronic control being operable to effect operation of said electro-hydraulic control valve so as to drive the actuator at a speed corresponding to a value of the door position signal received from the sensor arrangement representing said given position occupied by said door.

2. The baling press of claim 1 wherein said electronic control and said electro-hydraulic control valve are configured to control said actuator such that the beginning and the end of the movement of said door along said path is slower than the remainder of the movement.

3. A round baling press, comprising:

a baling press chamber being variable in volume and including a rear section defined by a door, said door being movable along a path between a closed position where said door extends along a back side of the baling press chamber and a fully open position defining a discharge opening of a maximum size for permitting a completely formed bale having a size which is a maximum size capable of being formed in said press chamber to be ejected from the baling press chamber; and a door position sensor arrangement being associated with said door for providing information of at least a plurality of positions of said door, including positions intermediate said closed and fully open positions, as said door moves between said closed and fully open positions, and the door position sensor arrangement being responsive to movement of said door for providing an electrical control signal having a value representing a given position occupied by the door as said door moves along the path;

an electronic control connected to the door position sensor arrangement;

an electro-hydraulic control valve connected to said electronic control;

an extensible and retractable hydraulic actuator connected to the electro-hydraulic control valve and to the door so as to be capable of moving the door between the fully open and closed positions, with the electronic control being operable to effect operation of said electro-hydraulic control valve so as to drive the actuator according to the electrical control signal value received from the sensor arrangement, and with said sensor arrangement monitoring the position of said door as said door moves between said fully open and closed positions and providing a door position signal representing a respective position occupied by the door at any given time; and a bale size sensor coupled to said electronic control and being operable for sending a bale size signal to said electronic control;

and an input device coupled to said electronic control and being operable for keying an input signal into said electronic control representing a desired bale size to be formed in said bale press chamber; and said electronic control being responsive to said input signal, to said bale size signal and to said control signal representing a position of the door to cause said electro-hydraulic control valve to control said actuator so as to move said door to a controlled open position corresponding to said desired bale size, with said controlled open position of said door providing a discharge opening, smaller than that provided when said door is at said fully open position, when said desired bale size is smaller than said maximum bale size, but being sufficiently large for permitting passage of a bale having said desired bale size.

4. A round baling press, comprising:

a baling press chamber having a door in the rear section of the baling press chamber, the door being movable along a path between a closed position where the door extends along the back side of the baling press chamber and an open position where a completely formed bale can be ejected from the baling press chamber; and a door position sensor arrangement including at least two sensors, one located at each of opposing sides of the door for providing information respectively of said opposing sides as the door moves between said closed and open positions; and said two sensors being responsive to movement of said door for providing a set of electrical control signals having respective values representing a given position occupied by the opposite sides of the door as said door moves along the path; and an electronic control being connected to said at least two sensors and being configured to record differences in positions of the two sides of the door; and a display device being coupled to said electronic control with said differences in positions of the two sides of the door being displayed by said display device in the form of a steering signal whereby an operator is informed of a direction to steer the baling press for eliminating said differences in position.

5. The baling press of claim 1 wherein the door is movable in a vertical direction between the closed position and the open position; and said sensor arrangement includes a distance sensor located on a bottom area of said door, when said door is in said closed position, and operable for sensing the distance between said bottom area and the ground.

6. The baling press of claim 5 wherein said distance sensor is a remote sensor operating without contact.

7. The baling press of claim 1 wherein said sensor arrangement includes at least one sensor configured to detect the position of said hydraulic actuator.

8. The baling press of claim 7 wherein said at least one sensor is configured as a flow sensor to sense an amount of hydraulic fluid flowing to or from said hydraulic actuator.

* * * * *